(12) United States Patent
Harris et al.

(10) Patent No.: US 8,185,890 B2
(45) Date of Patent: *May 22, 2012

(54) METHOD AND DEVICE FOR IMPLEMENTING A DOWNLOADABLE SOFTWARE DELIVERY SYSTEM

(75) Inventors: David Harris, Bozeman, MT (US); Mitchell William Koury, Bozeman, MT (US); William J. Moody, Belgrade, MT (US); Paul W. Bolton, Bozeman, MT (US); Phillip Louis Amicucci, Three Forks, MT (US); Robert Lyle Wall, Bozeman, MT (US); Charles Glen Swenson, Bozeman, MT (US)

(73) Assignee: IGT, Reno, NV (US)

( * ) Notice: Subject to any disclaimer, the term of this patent is extended or adjusted under 35 U.S.C. 154(b) by 1649 days.

This patent is subject to a terminal disclaimer.

(21) Appl. No.: 11/249,921

(22) Filed: Oct. 12, 2005

(65) Prior Publication Data

US 2006/0031829 A1 Feb. 9, 2006

Related U.S. Application Data

(63) Continuation of application No. 10/397,621, filed on Mar. 26, 2003, now Pat. No. 6,988,267, which is a continuation of application No. 09/586,522, filed on Jun. 2, 2000, now abandoned.

(60) Provisional application No. 60/137,352, filed on Jun. 3, 1999.

(51) Int. Cl.
*G06F 9/445* (2006.01)

(52) U.S. Cl. ......... 717/177; 717/173; 717/175; 717/178

(58) Field of Classification Search .......... 717/168–178; 713/190, 191
See application file for complete search history.

(56) References Cited

U.S. PATENT DOCUMENTS 5,033,744 A * 7/1991 Bridgeman et al. ............ 463/13
(Continued)

FOREIGN PATENT DOCUMENTS

CA 2375701 8/2010
(Continued)

OTHER PUBLICATIONS

Sheng Liang and Gilad Bracha "Dynamic Class Loading in the Java Virtual Machine" 1998, ACM, pp. 36-44.*

(Continued)

*Primary Examiner* — Phillip Nguyen
(74) *Attorney, Agent, or Firm* — Weaver Austin Villeneuve & Sampson LLP

(57) ABSTRACT

A method and device implementing a downloadable operatively connected to a plurality of gaming machines either by a direct communications link or through the use of one or more site controllers or PCs. Each gaming machine and site controller or PC contains two executable spaces, one of which typically contains the software image currently being implemented by the device. The other executable space is designated to receive from the central system a new software image that will be utilized by the device. The central system transfers a new image to be executed, via packet encrypted communications, to a networked device which stores the image in an executable space, while continuing to run the currently designated image. Upon instruction from the central system, the device switches over to the new image, allowing one or more machines to implement a software upgrade on a continuous basis.

25 Claims, 8 Drawing Sheets

U.S. PATENT DOCUMENTS

| | | |
|---|---|---|
| 5,136,644 A | 8/1992 | Audebert et al. |
| 5,155,837 A | 10/1992 | Liu et al. |
| 5,410,703 A | 4/1995 | Nilsson et al. |
| 5,421,009 A | 5/1995 | Platt |
| 5,421,017 A | 5/1995 | Scholz et al. |
| 5,473,772 A | 12/1995 | Halliwell et al. |
| 5,555,418 A | 9/1996 | Nilsson et al. |
| 5,643,086 A * | 7/1997 | Alcorn et al. .......... 463/29 |
| 5,654,746 A | 8/1997 | McMullan et al. |
| 5,655,961 A | 8/1997 | Acres et al. |
| 5,682,533 A | 10/1997 | Siljestroemer |
| 5,709,603 A * | 1/1998 | Kaye ................. 463/17 |
| 5,715,462 A | 2/1998 | Iwamoto et al. |
| 5,759,102 A * | 6/1998 | Pease et al. .......... 463/42 |
| 5,845,077 A | 12/1998 | Fawcett |
| 5,845,090 A | 12/1998 | Collins, III et al. |
| 5,848,064 A | 12/1998 | Cowan |
| 5,870,723 A | 2/1999 | Pare et al. |
| 5,885,158 A | 3/1999 | Torango et al. |
| 5,896,566 A | 4/1999 | Averbuch et al. |
| 5,905,523 A | 5/1999 | Woodfield et al. |
| 5,970,143 A | 10/1999 | Schneier et al. |
| 6,006,034 A | 12/1999 | Heath et al. |
| 6,029,046 A | 2/2000 | Khan et al. |
| 6,047,128 A | 4/2000 | Zander |
| 6,104,815 A | 8/2000 | Alcorn et al. |
| 6,110,041 A * | 8/2000 | Walker et al. .......... 463/20 |
| 6,149,522 A | 11/2000 | Alcorn et al. |
| 6,154,878 A | 11/2000 | Saboff |
| 6,219,836 B1 | 4/2001 | Wells et al. |
| 6,264,561 B1 | 7/2001 | Saffari |
| 6,317,827 B1 * | 11/2001 | Cooper ................. 713/2 |
| 6,319,125 B1 * | 11/2001 | Acres ................. 463/25 |
| 6,364,765 B1 * | 4/2002 | Walker et al. .......... 463/16 |
| 6,409,602 B1 * | 6/2002 | Wiltshire et al. ........ 463/42 |
| 6,488,585 B1 | 12/2002 | Wells et al. |
| 6,615,404 B1 * | 9/2003 | Garfunkel et al. ........ 717/173 |
| 6,620,047 B1 | 9/2003 | Alcorn et al. |
| 6,645,077 B2 | 11/2003 | Rowe |
| 6,682,423 B2 | 1/2004 | Brosnan et al. |
| 6,685,567 B2 | 2/2004 | Cockerille et al. |
| 6,712,698 B2 | 3/2004 | Paulsen et al. |
| 6,800,029 B2 | 10/2004 | Rowe et al. |
| 6,804,763 B1 | 10/2004 | Stockdale et al. |
| 6,805,634 B1 | 10/2004 | Wells et al. |
| 6,863,608 B1 | 3/2005 | LeMay et al. |
| 6,988,267 B2 | 1/2006 | Harris et al. |
| 7,470,182 B2 | 12/2008 | Martinek et al. |
| 2001/0003100 A1 * | 6/2001 | Yacenda ............. 463/41 |
| 2002/0137217 A1 | 9/2002 | Rowe |
| 2003/0054881 A1 | 3/2003 | Hedrick et al. |
| 2003/0064771 A1 | 4/2003 | Morrow et al. |
| 2003/0073497 A1 | 4/2003 | Nelson |
| 2003/0078103 A1 | 4/2003 | LeMay et al. |
| 2003/0188306 A1 | 10/2003 | Harris et al. |
| 2003/0203756 A1 | 10/2003 | Jackson |
| 2004/0002385 A1 | 1/2004 | Nguyen |
| 2004/0048667 A1 | 3/2004 | Rowe |
| 2004/0147314 A1 | 7/2004 | LeMay |
| 2005/0192099 A1 | 9/2005 | Nguyen et al. |
| 2006/0035713 A1 | 2/2006 | Cockerille et al. |

FOREIGN PATENT DOCUMENTS

| | | |
|---|---|---|
| EP | 0689325 A2 | 6/1995 |
| EP | 0706275 A2 | 4/1996 |
| EP | 0841615 A2 | 5/1998 |
| EP | 0905614 A2 | 3/1999 |
| EP | 1 004 970 | 5/2000 |
| EP | 1929448 | 6/2008 |
| WO | 01/20424 A2 | 3/2001 |
| WO | WO2004/025655 | 3/2004 |
| WO | WO2007/032943 | 3/2007 |

OTHER PUBLICATIONS

Michael Hicks, Jonathan T. Moore, and Scott Nettles "Dynamic Software Updating", 2001, ACM, pp. 13-23.*

P. Syverson, "Weakly Secret Bit Commitment: Applications to Lotteries and Fair Exchange", 1998.*

Nguyen et al., U.S. Appl. No. 11/078,966, filed Mar. 10, 2005.

Hiroaki Higaki, "*Group Communications Algorithm for Dynamically Updating in Distributed Systems*," IEEE 1994 International Conference on Parallel and Distributed Systems, 1994, pp. 56-62.

Hiroaki Higaki, "*Extended Group Communication Algorithm for Updating Distributed Programs*," IEEE 1996 Proceedings, International Conference on Parallel and Distributed Systems, 1996, pp. 386-393.

Hauptmann & Wasel, "*On-line Maintenance with On-the-fly Software Replacement*," IEEE 1996 Proceedings, Third Int'l Conference on Configurable Distributed Systems, 1996, pp. 70-80.

* cited by examiner

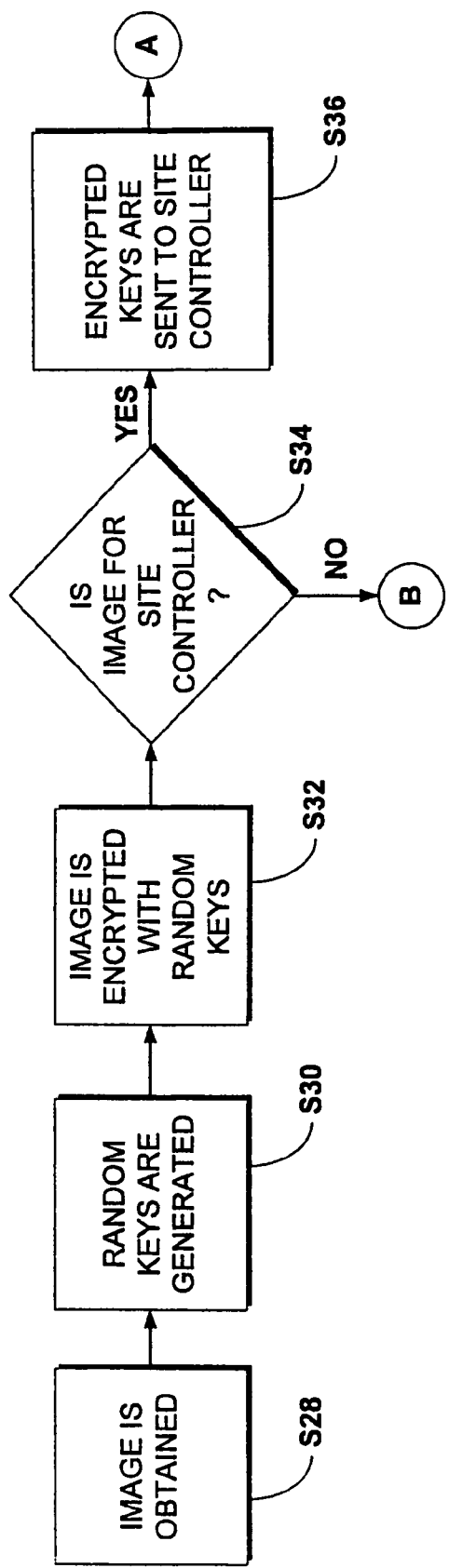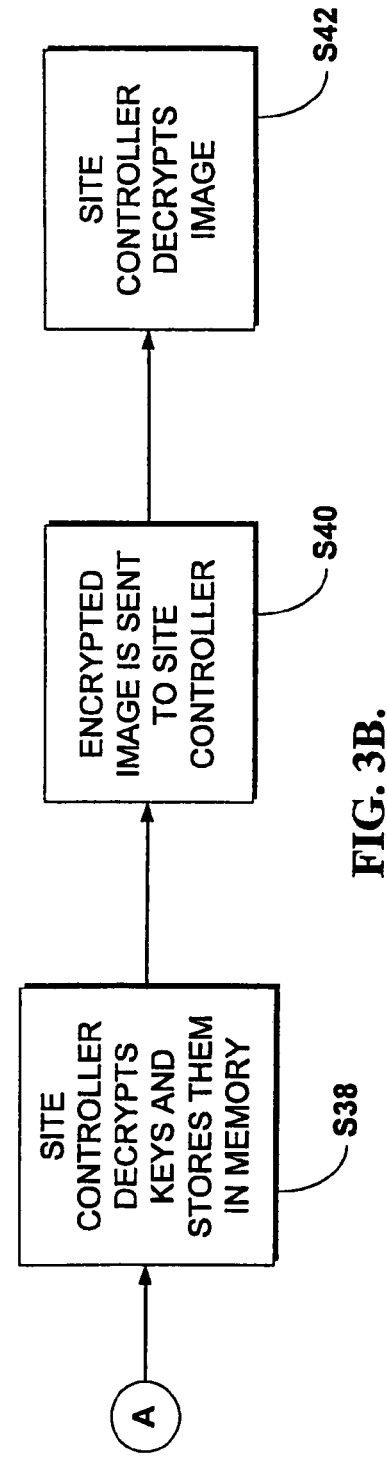
FIG. 3A.
FIG. 3B.

METHOD AND DEVICE FOR IMPLEMENTING A DOWNLOADABLE SOFTWARE DELIVERY SYSTEM

RELATED APPLICATION DATA

This application is a continuation of U.S. patent application Ser. No. 10/397,621, entitled METHOD AND DEVICE FOR IMPLEMENTING A DOWNLOADABLE SOFTWARE DELIVERY SYSTEM by Harris et al., filed on Mar. 26, 2003 now U.S. Pat. No. 6,988,267, which is a continuation of U.S. patent application Ser. No. 09/586,522, entitled METHOD AND DEVICE FOR IMPLEMENTING A DOWNLOADABLE SOFTWARE DELIVERY SYSTEM by Harris et al., filed on Jun. 2, 2000 (Abandoned), which claims priority of U.S. Provisional Patent Application No. 60/137,352, entitled METHOD AND DEVICE FOR IMPLEMENTING A DOWNLOADABLE SOFTWARE DELIVERY SYSTEM by Harris, et al., filed on Jun. 3, 1999. This application claims priority of each of the above-referenced applications pursuant to the provisions of 35 U.S.C. 120. Each of the above-referenced applications is hereby incorporated by reference.

This application is entitled to priority pursuant to a provisional application filed Jun. 3, 1999, entitled METHOD AND DEVICE IMPLEMENTING A DOWNLOADABLE SOFTWARE SYSTEM, Ser. No. 60/137,352.

TECHNICAL FIELD

In general, this invention relates to a downloadable software system, and more particularly, to a method and device implementing a downloadable software system for an electronic gaming machine communications network.

BACKGROUND OF THE INVENTION

In general, conventional gaming machine networks typically include a central system operatively connected to one or more individual gaming machines via intermediate communication site controllers. Although the gaming machines communicate with the central system, each gaming machine or site controller contains a central chipset which locally stores the computer code to be is executed by the device to perform gaming related functions. These chipsets typically consist of electronic programmable read only memory (EPROM) which permanently store the computer code. EPROM chipsets are conventionally preferred because the electronic memory can be controlled in a secured manner without giving unauthorized access to the gaming machine code. For example, in the event the computer code needs to be upgraded, service personnel are required to manually change the chipset for each gaming machine and/or site controller.

Because a service technician must perform the same operation for each machine or controller, the current method of upgrading gaming machine/site controller or PC software typically takes a long time to accomplish at a substantial cost, including the cost of the technician time and the cost of a new chipset for each machine.

Accordingly, there is a need for a system which can upgrade computer code within a networked device without requiring a manual change in the device components or requiring a high cost of implementation.

SUMMARY OF THE INVENTION

Generally described, a gaming machine system is provided. The gaming machine system includes a central system and one or more gaming devices having at least one storage component operable to receive an executable software image and in communication with the central system. Additionally, the gaming device receives the software image from the central system.

In another aspect of the present invention, a method in a computer system for implementing a gaming machine system including a central system in communication with one or more gaming devices is provided. In accordance with the method, a software image to be downloaded to the one or more gaming devices is obtained. The software image is downloaded to a selected group of the one or more gaming devices.

In a further aspect of the present invention, a method is a computer system for implementing a download of a software image is provided. In accordance with the method, a central process obtains a software image to be downloaded and transfers the software image to one or more device processes. The one or more device processes receives and stores the software image. At least one of the one or more device processes executes the software image.

In yet another aspect of the present invention, a gaming machine system is provided. The gaming machine system includes a central system and one or more gaming devices having storage means for receiving an executable software image. The one or more gaming devices are in communication with the central system. Additionally, the gaming machine system includes downloading means for transferring the software image from the central system to the one or more gaming devices.

A method and device implementing a downloadable software delivery system for an electronic gaming machine communications network is provided. A central system is operatively connected to a plurality of gaming machines either by a direct communications link or through the use of one or more site controllers. In this regard, it is contemplated that a PC or suitable computing device could be substituted for a site controller and that the downloadable software delivery still be effected. Each gaming machine and site controller or PC contains two executable spaces, one of which typically contains the software image currently being implemented by the device. The other executable space is designated to receive from the central system a new software image that will be utilized by the device. The central system transfers a new image to be executed, via packet encrypted communications, to a networked device which stores the image in an executable space, while continuing to run the currently designated image. Upon instruction from the central system, the device switches over to the new image, allowing one or more machines to implement a software upgrade on a continuous basis.

BRIEF DESCRIPTION OF THE DRAWING

The present invention is described in detail below with reference to the attached figures, wherein:

FIGS. 3A, 3B & 3C are flow diagrams illustrative of a software image transfer method utilizing random key encryption in accordance with the present invention;

DETAILED DESCRIPTION OF THE INVENTION

In essence, the present invention enables a central system operatively connected to a plurality of gaming machines and site controllers (or PC's) to upgrade one or more software images via a communications link without requiring a manual change of the device chipset.

Figure 1:
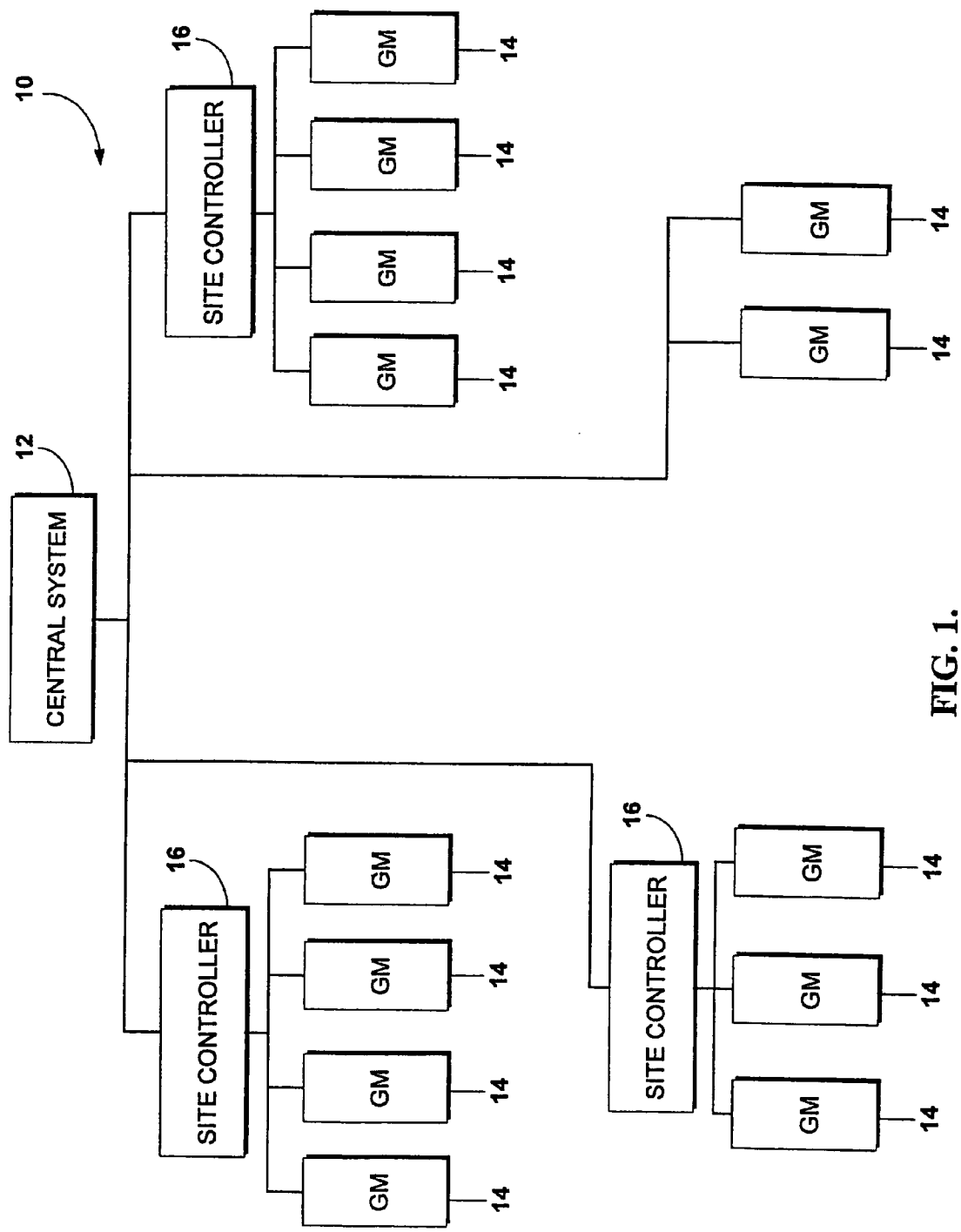
FIG. 1 is a block diagram of a gaming machine network utilized in accordance with the present invention.

FIG. 1 is block diagram illustrative of a gaming machine network operable to be utilized by the present invention, designated generally by the reference numeral 10. Generally, the gaming machine network 10 includes a central system 12 operatively connected to a number of gaming machines 14 either by a direct communication link to each individual machine 14 or indirectly through the one or more site controllers or PC's 16. The connectivity of the central system 12 to the gaming machines 14 can include continuous, on-line communication systems, including local area networks and/or wide area networks, or may be periodic, dial up semi-continuous communications. Because many gaming machine network currently utilize some type of communication network, the present invention preferably utilizes the preestablished communication system between the central system and the gaming machines such as through telephone, cable, radio or satellite links. However, a dedicated software delivery communication network may also be implemented and is considered to be within the scope of the present invention.

Figure 2:
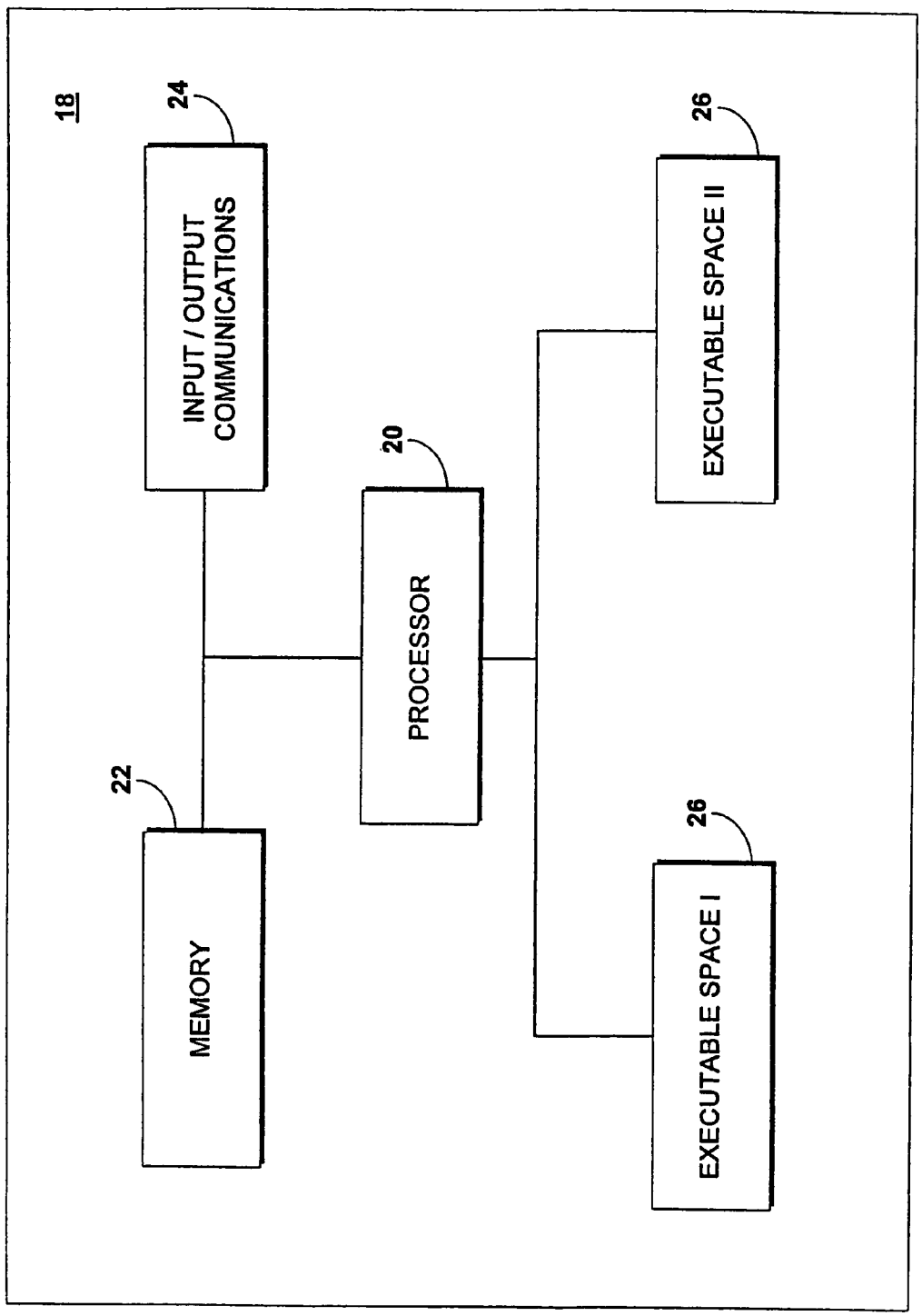
FIG. 2 is a block diagram illustrative of various device components utilized in accordance with the present invention.

FIG. 2 is a block diagram illustrative of some of the components common to the gaming machines 14, site controllers 16 or other networked device (FIG. 1), generally referred to as a device 18, utilized in the present invention. Each device 18 preferably contains a processor 20, a memory 22, a communications input/output 24, such as a modem or network card, and at least two executable spaces 26. As would be readily understood by one skilled in the relevant art, the processor 20, memory 22 and communications input/output 24 includes any variety of component generally utilized in the implementation of the device. Moreover, in one embodiment, one or more of the executable spaces 26 are FLASH ROM. However, as would be readily understood, the executable spaces 26 may include DVD, CD-ROM, battery backed RAM or any other nonvolatile memory storage device.

Preferably, one executable space 26 is typically designated to store the software code, or image, currently being executed by the device 18. The other executable space is typically designated to receive a new image transferred by the central system. As would be understood, although the two executable spaces are preferably separate, the same effect is accomplished through the use of a single, larger executable space. In this embodiment, each device uses a portion of the executable space 26 to assist in receiving and storing incoming images from the central system.

As an alternative embodiment, the present invention may also be implemented with one executable space and sufficient other memory, which can include memory 22, to temporarily store a downloaded image. In this embodiment, the image would be downloaded to the temporary memory and then transferred to the more permanent executable space 26.

Generally, the present invention facilitates the implementation and replacement of a software image on a device in a gaming machine network by allowing the transmittal of a new image to a device while the device continues to execute and/or process a previous software image. Additionally, because the present invention may utilize one or more existing communication lines, the transfer of a new image can include various security and error checking features to ensure and preserve the secured character of the executable code.

Figure 3C:
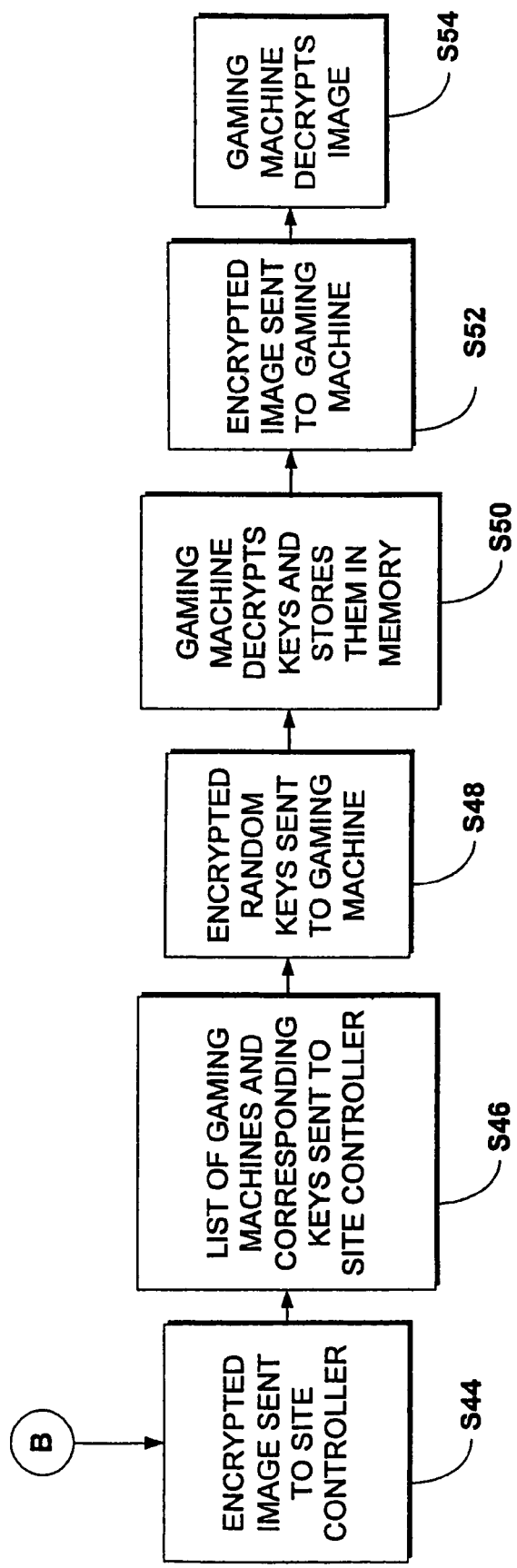

FIGS. 3A, 3B & 3C are flow diagrams of an image downloading process utilizing a random key encryption in accordance with the present invention. With reference to FIG. 3A, at S28, the desired image to be downloaded is created, and loaded into the central system. Preferably, the operating system of the central system provides a user interface, such as a graphical user interface, that allows a user to download the image to the central system's memory. Additionally, the user interface can include prompts for a user to enter additional information needed for the downloading process including download time information, download windows and version numbers. As would be understood, depending on the function of the image being downloaded, the additional information needed to complete the download will vary.

Once the image has been downloaded to the central system, the user selects which devices are to receive the image. The user selection can include all of the devices or subsets of devices. Preferably, the central system includes some form of error checking that ensures that the designated device is compatible with the image to be downloaded. At S30, the central system generates a random encryption key for each device designated to receive the image and encrypts the image with each of the random keys at S32. The random keys and encrypted images are stored in the central system memory. Additionally, the central system stores a completed, unencrypted version of the image in memory to use a signature for verification that the download is complete.

Generally, the function of a site controller (or PC) download differs from the function of the gaming machine download. Accordingly, at S34 a determination of whether the download is for a site controller is made. With reference to FIGS. 3A & 3B, if at S34 the desired image is designated to be downloaded to a site controller or PC, the random keys used to encrypt the image are themselves encrypted with a general encryption key and sent to the site controller at S36. At S38, the site controller or PC decrypts the random keys and stores the keys in a memory, such as memory 22 (FIG. 2). The central system then sends the random key encrypted message to the site controller at S40. Once the download is complete, the central system sends additional instructions to the site controller such as to decrypt the image with the stored random keys or to store the image into its second executable space.

With reference to FIGS. 3A & 3C, if at S34, the desired image is designated to be downloaded to a gaming machine or other device, the central system sends the encrypted message to the site controller (or PC) associated with the particular gaming machine at S44, preferably in a manner as described above in steps S36-S42. At S46, the central system sends the site controller a list of the gaming machines to receive the image and their preassigned general encryption keys, which are encrypted with a key known to the gaming machine. At S48, the site controller transfers the encryption keys to the gaming machine, which decrypts and stores the random keys in memory. The site controller then sends the random key encrypted image to the gaming machine at S50. Once the download is complete, the central system instructs the gaming machine, via the site controller, to prepare and store the image into its second executable space at S54.

Figure 4A:
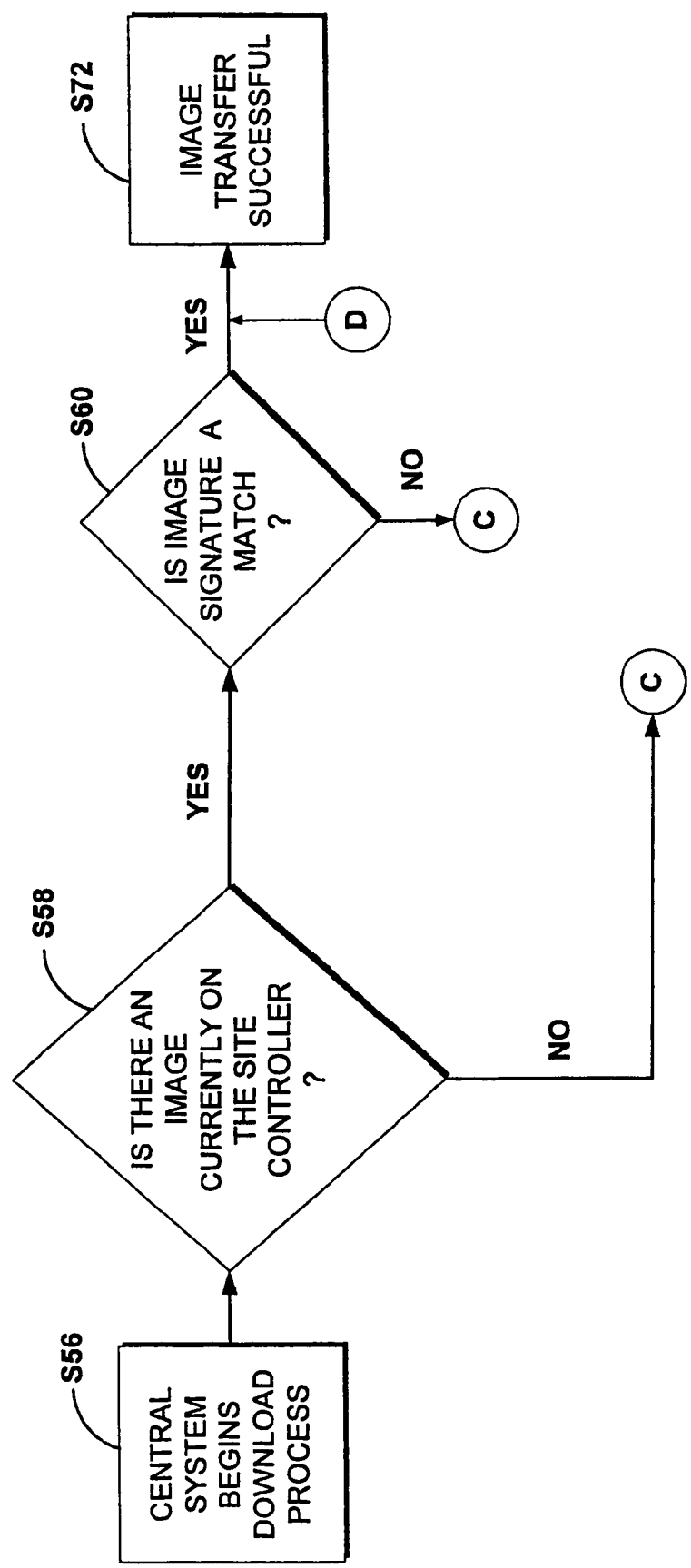
FIGS. 4A & 4B are flow diagrams illustrative of an image transfer error checking and bypass process in accordance with the present invention.
Figure 4B:
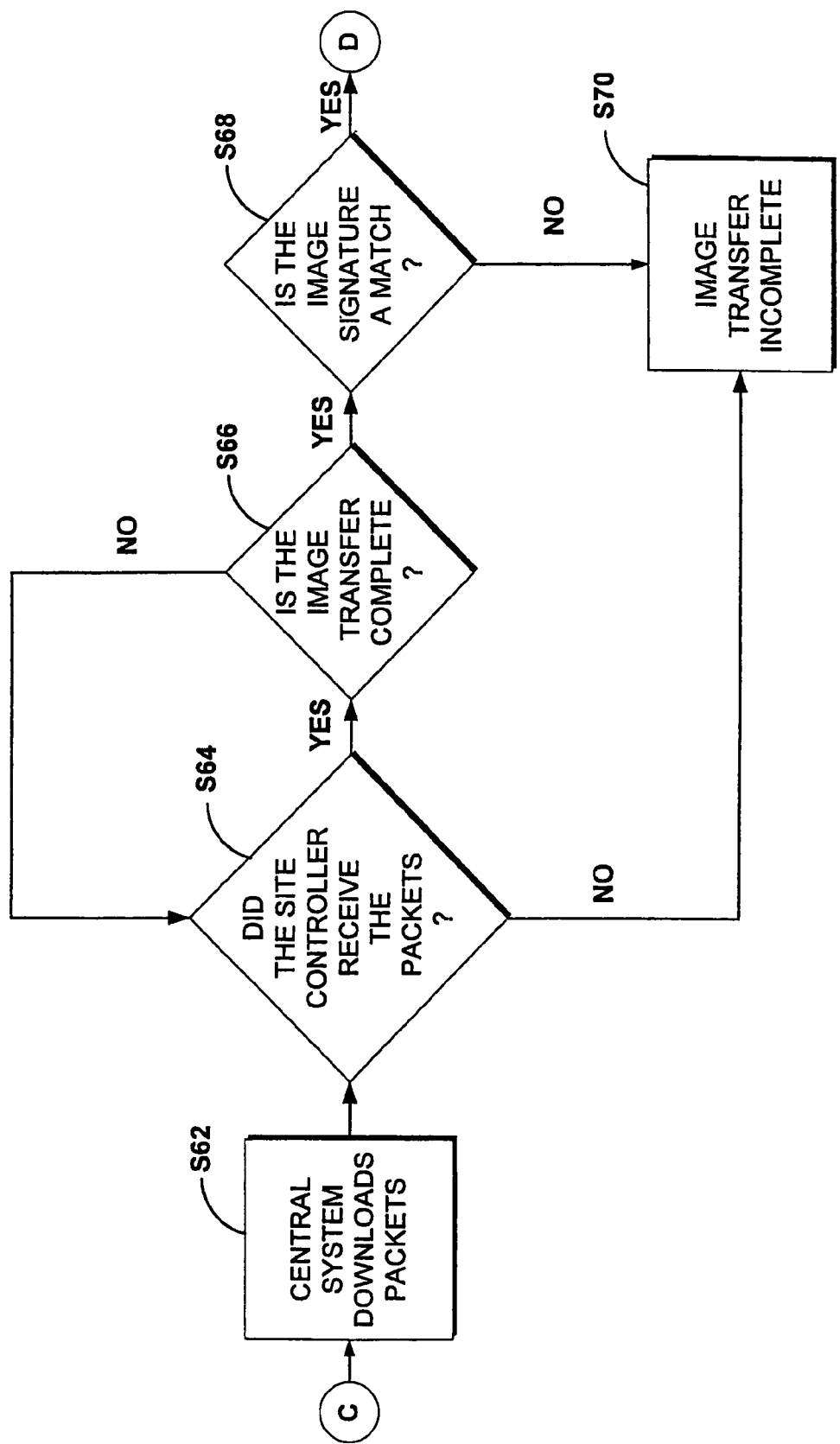

With reference to FIGS. 4A & 4B, the present invention implements a bypass and error checking function between the central system and the site controller or PC. Because the site controller can be associated with a number of gaming machines or other devices, once the site controller stores the image into its executable space, it does not need to reexecute the downloading step for each subsequent transfer to a gaming machine. With reference to FIG. 4A, the central system begins the download process each time an image is to be transferred to a device as illustrated at S56. At S58, the central system checks whether a downloaded image has already been stored in the site controller's executable space. If so, at S60, the central system verifies that the signature of the image loaded on the site controller is correct and the transfer is complete at S72. With reference to FIGS. 4A & 4B if an image is not present in the site controller's executable space at S58 or if the signature does not match at S60, the central system sends the image via packets to the site controller or PC at S62.

Preferably, the central system relies on package acknowledge signals from the site controller to ensure that each individual packet is received by the site controller. Accordingly, at S64, the central system determines whether all the packets have been received. If one or more package acknowledge signals are not received, the transfer is incomplete at S70. At this point, the central system may resend the individual packets not received or may attempt to resend the entire image. Alternatively, the central system may just declare the transfer a failure.

If the packets are received and acknowledged at S64, the central system completes the transfer at S66. At S68, the central system requests a signature of the image from the site controller to verify a proper transmission and decryption. With reference to FIGS. 4A & 4B, if the signature is a match, the download is a success at S72 and the site controller implements any downloading instruction. If the signature is not a match, the transfer is incomplete at S70.

Figure 5:
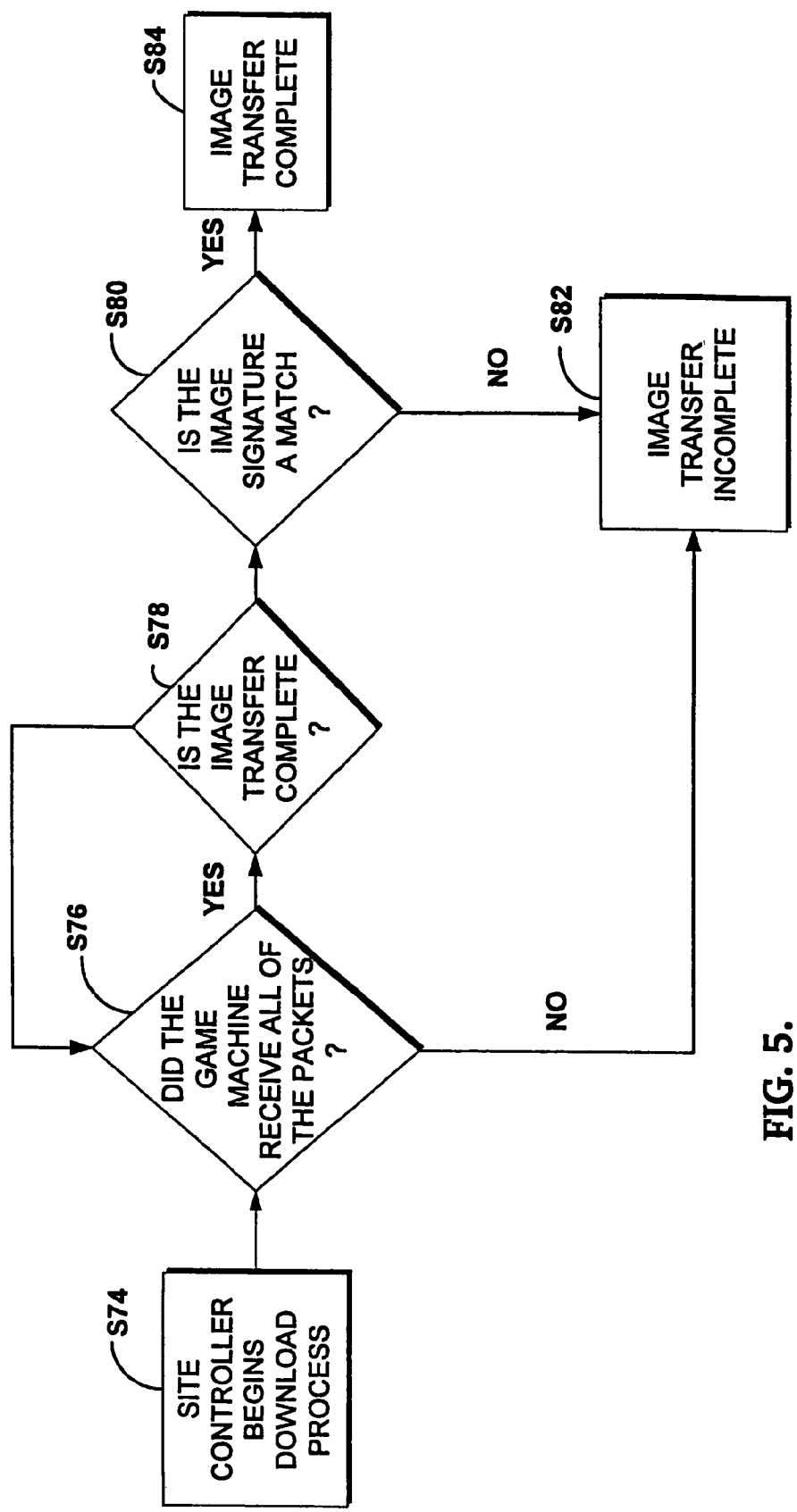
FIG. 5 is a flow diagram illustrative of a software image transfer method to a gaming machine in accordance with the present invention.
Figure 6:
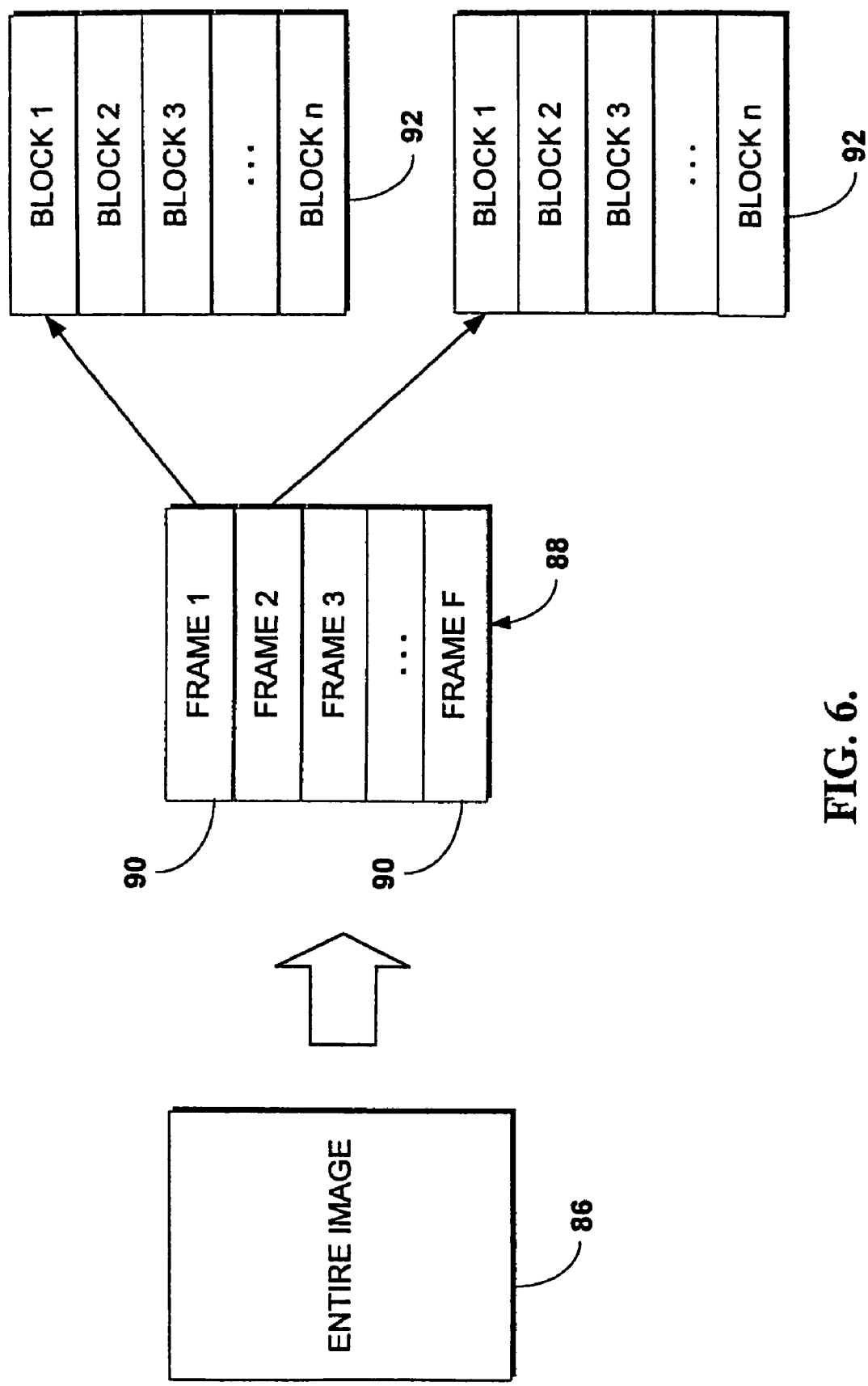
FIG. 6 is a block diagram illustrative of a software image parsing embodiment in accordance with the present invention.

With reference to FIG. 5, the present invention also implements an error transfer method for the downloading of an image from the site controller to the gaming machine. Upon receiving and storing the downloaded image in memory, the site controller (or PC) begins the download to the gaming machine at S74. Preferably as illustrated in FIG. 6, the software image 86 is organized into one or more frames 88 which are further organized into one ore more blocks 92 per frame. Each of the blocks 92 can then be transferred as individual communication packets. During the download process, site controller transfers all packets that make up the frame with reference again to FIG. 5, at the end of the transfer frame the site controller requests an acknowledgment from the gaming machine at S70.

If the gaming machine did not receive some portion of the frame, the transfer is incomplete at S82. The site controller preferably resends only those packets which are incomplete. Alternatively, the entire image may be resent or the transfer may be declared a failure. Accordingly, the gaming machine does not need to acknowledge receipt of each packet. As would be understood, however, alternative methods of grouping and sending the software image would be considered within the scope of the present invention.

Upon the transfer of the entire image to the gaming machine at S78, the central system requests an image signature to verify the transfer was successful at S80. If the signature is a match, the transfer is successful at S84. If the image is not a match, the image is incomplete at S82.

The above-described transfer protocols have been incorporated with reference to two separate encryption methods. As would be understood, a system implementing only a portion, different or no encryption methods would be considered within the scope of the present invention.

Once the image has been successfully transferred to the device, the image can be executed. Preferably, the central system sends a command to the device to begin using the new image in the executable space. This command typically includes separate instructions for configuring the system to accommodate the new image and preventing the future play of the current image while the switch is occurring. Upon the completion of the command, the device begins executing the new image and the switch is complete.

Because the device contains at least two separate executable spaces, the old image previously being executed remains in the device executable space after the switch is complete. In the event that the new image is corrupt or not functioning properly, the central system can execute a command to revert to the old image if it is still available and intact.

Although the devices specifically referenced in the present application refer solely to gaming machines or site controllers or PCs, the present invention allows images to be transferred to any device that is configured to receive an image. Such devices could include peripheral devices such as printers and bill acceptors or other intermediate communications devices. As would be understood, the images associated with each device would vary with the type of device and its function in the system.

In the foregoing specification, the present invention has been described with reference to the specific exemplary embodiments thereof. It will be apparent to those skilled in the art that a person understanding this invention may conceive of changes or other embodiments or variations, which utilize the principals of this invention without departing from the broader scope of the invention.

What is claimed:

1. A method of downloading a software image to a device having a memory for player wagering, the method comprising:

providing a first software image in a first memory location of the memory;

executing the first software image from the first memory location to provide a first game of chance on the device;

receiving one or more encrypted encryption keys at the device;

receiving a command from a central system over a communications network to decrypt the one or more encrypted encryption keys;

decrypting the one or more encrypted encryption keys to produce one or more encryption keys;

receiving an encrypted second software image while the first software image is executing;

receiving a command from the central system over the communications network to decrypt the encrypted second software image;

decrypting the encrypted second software image using the one or more encryption keys to produce a second software image; and storing the second software image to a second memory location of the memory, the second software image executable from the second memory location or a third memory location to provide a second game of chance on the device, the second software image executable in response to a command received from a central system over a communications network.

2. The method of claim 1, further comprising:

terminating execution of the first software image at the device; and executing the second software image from one of the second memory location or the third memory location to provide the second game of chance at the device.

3. The method of claim 1, wherein the memory is situated internal to the device.

4. The method of claim 1, wherein the memory is situated external to the device.

5. The method of claim 1, wherein the device is a gaming machine.

6. The method of claim 1, wherein the device is a personal computer.

7. The method of claim 1, wherein the device is a peripheral device.

8. The method of claim 1, comprising:
storing the second software image at the device while the first software image is executing.

9. The method of claim 1, comprising:
determining an error condition of the second software image; and
executing the first software image when the error condition is determined.

10. The method of claim 1, wherein the first memory location is a first executable space and wherein the second memory location is a second executable space.

11. The method of claim 1, wherein the first memory location is a first portion of a single executable space and the second memory location is a second portion of the single executable space.

12. The method of claim 1, wherein the first memory location is a first executable space and the second memory location is a temporary storage location and wherein the second software image is transferred from the second memory location to the third memory location for execution.

13. The method of claim 1, wherein the first memory location, the second memory location, the third memory location or combinations thereof are memory locations in one or more non-volatile memory storage devices.

14. The method of claim 13, wherein the one or more non-volatile memory storage devices are selected from a group consisting of a FLASH ROM, a DVD, a CD and a battery-backed RAM.

15. A device for executing software images for player wagering, the device comprising:
a memory having a first memory location and a second memory location, the first memory location storing a first software image;
a processor configured to execute the first software image from the first memory location to provide a first game of chance on the device;
a communications interface in communication with a communications network, the communications interface configured to receive, over the communications network:
an encrypted second software image while the first software image is executing;
one or more encrypted encryption keys;
a first command from a central system to decrypt the one or more encrypted encryption keys, and
a second command from the central system to decrypt the encrypted second software image; and
the processor further configured to:
decrypt the one or more encrypted encryption keys to produce one or more encryption keys in response to the receipt of the first command;
decrypt the encrypted second software image using the one or more encryption keys to produce a second software image in response to the receipt of the second command,
store the second software image in the second memory location, and
execute the second software image from the second memory location or a third memory location to provide a second game of chance on the device, the second software image executable responsive to a command to begin using the second software image received from a remote device in communication with the communications network.

16. The device of claim 15, wherein the remote device is a central system or a site controller.

17. The device of claim 15, wherein the first memory location is a first executable space and wherein the second memory location is a second executable space separate from the first executable space.

18. The device of claim 15, wherein the first memory location is a first portion of a single executable space and the second memory location is a second portion of the single executable space.

19. The device of claim 15, wherein the first memory location is a first executable space and the second memory location is a temporary storage location and wherein the second software image is transferred from the second memory location to the third memory location for execution.

20. The device of claim 15, wherein the first memory location, the second memory location, the third memory location or combinations thereof are memory locations in one or more non-volatile memory storage devices.

21. The device of claim 20, wherein the one or more non-volatile memory storage devices are selected from a group consisting of a FLASH ROM, a DVD, a CD and a battery-backed RAM.

22. The device of claim 15, wherein the device is a gaming machine.

23. The device of claim 15, wherein the device is a personal computer.

24. The device of claim 15, wherein the device is a peripheral device.

25. A method of downloading a software image to a device having a memory for player wagering, the method comprising:
providing a first software image in a first memory location of the memory;
executing the first software image from the first memory location to provide a first game of chance on the device;
receiving one or more encrypted encryption keys at the device;
receiving a command from a central system over a communications network to decrypt the one or more encrypted encryption keys;
decrypting the one or more encrypted encryption keys to produce one or more encryption keys;
storing the one or more encryption keys in the memory;
receiving an encrypted second software image while the first software image is executing;
receiving a command from the central system over the communications network to decrypt the encrypted second software image;
decrypting the encrypted second software image using the one or more encryption keys to produce a second software image;
storing the second software image to a second memory location of the memory, the second software image executable from the second memory location or a third memory location to provide a second game of chance on the device, and the second software image executable in response to a command received from the central system over a communications network.

* * * * *